United States Patent Office 3,244,493
Patented Apr. 5, 1966

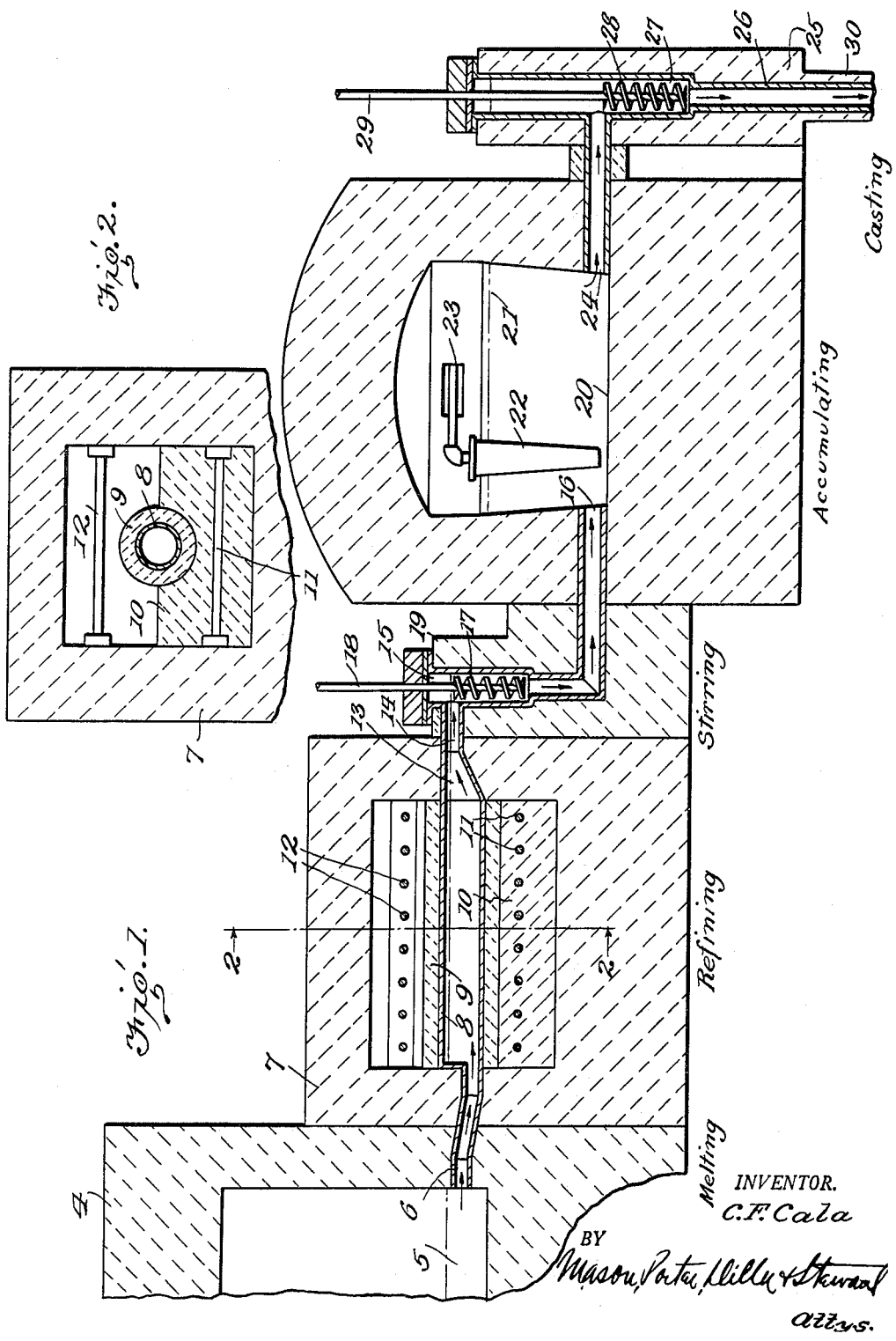

3,244,493
**PROCESS AND APPARATUS FOR MAKING HOMO-
GENEOUS GAS-FREE OPTICAL GLASS**
Charles F. Cala, Irondequoit, N.Y., assignor to Bausch &
Lomb Incorporated, a corporation of New York
Filed May 9, 1951, Ser. No. 225,331
9 Claims. (Cl. 65—134)

The following specification relates to the production of large objects of optical glass relatively free from apparent bubbles of occluded gases and having a homogeneous composition with a uniform refractive index.

For scientific and technical purposes it is important to fabricate optical glasses in large elements or masses such as plates or lenses. These masses are in the order of ten inches in diameter and one inch thick, such being considered large objects in these operations. However, the invention as described is capable merely by change in size of equipment and without modification of process of producing plates or lenses exceeding fifty inches in diameter and four inches thick.

To be used successfully for optical purposes, such objects must be relatively free from the gas bubbles developed in the production of the melt and which frequently exceed 0.5 millimeter in diameter individually. The total allowable projected area of all such bubbles is in the order of magnitude of 0.1 square millimeter on the surface per ten centimeters of light path and the number of such bubbles cannot exceed one per cubic centimeter of mass.

For optical purposes it is important that such large masses have a refractive index which is uniform over the entire volume. This means that the melt from which the mass is cast must be free from localized inclusions of different indices and usually termed cords, striae and stones. Any local inclusions of different refractive index must be so small that they are not perceptible when a beam of light from a pinhole 0.2 millimeter in diameter is projected from a distance of one meter on to the glass and thence to a fine grained screen one meter remote from the glass.

Again the value for optical purposes is largely dependent on uniform homogeneity. That is, there must not be an appreciable variation in refractive index over the volume of the mass due to variations in the constituent portions of the melts which are merged in the final casting. The maximum allowable difference in index through the element must be substantially below $1 \times 10^{-5}$. In the usual practice, glass removed from the continuous furnace or melter will contain bubbles, cords and non-homogeneous portions. It will be understood that the bubbles are due to gases evolved when the raw material is melted but which have not been released or discharged from the mass. The non-homogeneous portions, cords, striae and stones, result from localized tension created by solution of the materials which do not attain sufficient fluidity to be merged with the surrounding portions.

When one batch of melt is discharged from the tank and combines with a previously formed or "older" mass, the streams are rendered non-homogeneous if the newer glass contains unassimilated matter of a composition or mass having a content differing from the normal.

It is one purpose of this invention to condition such conventionally melted glass in a manner to eliminate these irregularities.

One principal feature of this invention is in taking the successive portions of glass melt from the melting furnace and refining them by a continuous passage through a path affording extensive surface, so that the contained gas bubbles more readily coalesce, rise to the surface and are there discharged.

Another object of this invention is to merge such successive portions of melt thus refined into a reservoir or accumulator where the mixture is stirred and rendered homogenous to the extent that local inclusions are eliminated.

Finally, the combined accumulation is then discharged in one operation to form a single large object in which the refractive index is substantially uniform through the working area.

As will be apparent, the successive and combined operations unite to form a unitary process for effectively carrying out the invention.

A substantial advantage of the invention is also in the provision of improved facilities and apparatus for carrying out the process above outlined.

As illustrating the invention as embodied in a novel apparatus by which the process is carried out, I have illustrated the preferred form of the invention in the accompanying drawings in which FIG. 1 is a longitudinal vertical section of the apparatus embodying the invention and its practice and FIG. 2 is a cross-secion of the refining element forming part of the apparatus, taken on line 2—2 of FIG. 1.

Briefly considered, the invention involves the successive treatment of the individual glass melts. The first stage of the invention is to improve the operation of refining the individual melts which, when emerging from the melting furnace, contain bubbles of gases, cords and non-homogeneous portions. By this invention, each melt is first treated so that it will lose the greater portion of the gas bubbles, and what remain will not impair the optical properties.

It is imperative to have, disregarding other details, a long path of restricted cross section for the melted glass to proceed while exposed to the gaseous space normally receiving the gas from the refining process. It should be remembered that the refining process of glass deals with the evolution of gas from the glass in which it is originally dissolved, its collection in the form of bubbles, the collection of bubbles into larger bubbles surging through the surface into the atmosphere, this latter process being favored by temperature, and chemical fining agents, in the batch releasing a different gas, usually oxygen, or by any other means providing a supply of oxygen, or another gas different from that evolved by the glass.

The detailed means to provide the long path of restricted cross section are not critical in any respect other than the characteristic requirement of preventing some portion of the stream to significantly overtake another.

The melt still requires to be rendered reasonably free from non-homogeneous portions. This is accomplished by seasoning the successive melts in a quiescent mass with moderate agitation of stirring.

Since the objects to be cast are too large for a single melt to suffice, and a considerable number of melts have to be utilized for a single casting, it is important that the several melts be blended in such a way that their optical properties are uniform. For example, glass fresh from the melting furnace, if added to glass which has been standing, will introduce unassimilated matter of a composition differing from the average or normal and containing a different gas content. By refining each batch of the melt separately, merging them, and then holding the merged mass with moderate stirring for a considerable time, the entire mass will be rendered uniform as to its refractive index and relatively free from irregularities and occluded gas bubbles.

Referring to the appended drawings, these purposes are attained by the apparatus as illustrated. A conventionally heated melting furnace 4 is provided. This is kept at a temperature sufficient to melt the glass batch from the materials as fed into the furnace. A temperature of 1400 to 1450° C. has been found suitable for optical glass of well known type and formula.

The melt 5 in the furnace at the level indicated by the dot-dash line is caused to flow through the discharge duct 6. This duct and all subsequent surfaces coming in contact with the molten glass is made or lined with a rare metal not affected by the melt. Platinum is the most satisfactory for this purpose.

The melt is delivered to a refining furnace 7. This furnace is maintained at approximately the same temperature as the melting furnace. The interior of the refining furnace has a refining channel 8. The channel is a relatively long tube, shown for example as circular in cross-section. It is made of platinum or other suitable metal which will not affect the melt. The channel provides a trough through which the melt flows as an attenuated stream at slow speed. In the course of the travel the gases in the melt rise to the surface and escape due to the shallowness of the stream and the sustained heat which maintains low viscosity. Thus the gas bubbles coalesce and their rise and escape is facilitated.

The channel 8 is surrounded by a ceramic coating or jacket 9 which is capable of withstanding the heat of the furnace. The jacket 9 rests on a bed 10 of heat insulating material in which the jacket is half-submerged (FIG. 2).

A series of resistance heating bars 11 extend across and through the bed 10. These may be of the Calrod type or similar.

A second series of similar bars 12 extend across the furnace 7 above the channel 8. The two series of bars maintain the jacket 9 and channel 8 at a temperature substantially equal to that of the melting furnace 4.

The melt substantially free from large gas bubbles flows through the throat 13 of the refiner 7 and into a discharge duct 14.

The discharge duct 14 is extended downwardly to provide a vertical chamber 15. The stirring chamber is not designed to have any correlation to the volume or the speed of ultimate consumption of glass, but only in correlation to optimum stirring conditions.

In order to avoid contamination, platinum or platinum lined stirrers are used. The position is central or nearly central, and the speed is high compared to conventional stirring. The speed may, for example be 100 revolutions per minute. The exact speed is adjustable to the demands of the particular melt. For such conditions, the material, platinum or platinum lined molybdenum—as may be used—are generally to be considered mechanically weak. Therefore, a large cross section of the stirring element is not easily obtainable. On the other hand, a cross section close to the total cross section of the compartment should be covered by the stirring action.

It has been found that the optimal cross section with material now available, at practical speeds and considering normal viscosities of glass, would be about 3–5″. This invention allows for variations of this compartment in regard to length and size; however, the principle is that these dimensions are entirely independent of melting and working speed as well as volume and are, in general, leading to a stirring volume being much smaller than that of the homogeneized glass ultimately accumulated in the next unit.

This chamber 15 in turn leads to a delivery pipe 16. The chamber 15 contains a spiral stirrer 17 mounted on the vertical shaft 18.

A heat-insulating jacket 19 surrounds the piping, chamber and conveyor.

The glass obtained from this stirring unit is expected to be substantially free from cords and bubbles. The stream emerging from this unit will, however, show two remaining deficiencies:

(a) It will show a slight fluctuation with time because of natural imperfections of the system, this fluctuation being, however, of some importance, as far as index homogeneity to better than the 5th place is concerned.

(b) It will contain occasional fine cord, derived from the chance of prolonged exposure to a surface which so far has been large compared to the volume, or from other imperfections.

It is the purpose of the following unit, the reservoir or accumulator 20, to homogenize with a small surface compared to the volume, at a lower temperature minimizing reaction with the atmosphere, the entire volume required for the maximum object size to be obtained from this volume.

In the example here presented the volume is sufficient to cast, e.g., a 50″ x 4″ plate.

It is not possible to stir this volume by a central, high speed platinum stirrer; however, from what has been said before it will be evident that this is unnecessary. The volume is now being homogenized at low temperature by a slow, rotational and, therefore, more conventional stirring process.

The accumulator 20 is maintained at a temperature somewhat below that of the refiner and conveying equipment. A temperature of 1250° C. is found effective. The reservoir 20 is also lined with platinum or like inert material which will not contaminate the molten glass. The melt is delivered by discharge pipe 16 into the reservoir. The reservoir receives successive melts that have been refined, stirred and conveyed to it. The level of the combined melts may reach the point indicated by the dotted line 21. The successive melts are allowed to accumulate in the reservoir 20 and to merge into a unitary mass. In the course of this operation, a certain degree of mixture occurs. The mass is further stirred by a stirrer 22 operated through an access opening 23. By this means, the unitary mass of molten glass is slowly stirred. There is thus a further purification by elimination of localized irregular inclusions such as cords, striae, stones and the like.

The mass of glass in the reservoir is allowed to accumulate, receiving successive additions from the reservoir. When the mass has become large enough to supply a single large mold of the desired size, the intake of the reservoir is interruped by a "freeze valve" in the stirring area of jacket 19. The contents of the reservoir are then drawn off as a unitary mass through discharge pipe 24. The pipe 24 leads into an insulated jacket 25 through which there is a vertical passageway 26, also lined with platinum or the like.

The upper portion of the passageway is enlarged to provide a chamber 27 through which stirrer 28 is operated. The stirrer, like stirrer 17, is formed of platinum or faced with it and rotated at the desired speed by the central shaft 29.

The function of the second stirrer is that of safety. The last remainders of small individual discontinuities, e.g. a small filament of glass deriving from a long stay on the accumulator surface, or any other imperfection, will still be stirred into the flow of homogeneous glass that is now streaming into the mold.

The dimensions of the second stirrer are selected in the same way as those of the first stirrer, and will generally be equal or similar in width.

The length of stirrer ending in the final exit tube, is guided by the exact viscosity desired and exemplified in the drawing.

The temperature of the discharge in the insulated jacket 25 is maintained slightly higher than in the reservoir, preferably at 1300° C. By the use of a "freeze valve" at this point, the discharge from the reservoir is prevented until actual casting is desired, or a complete emptying of the reservoir is required.

The "freeze" valve in advance of the accumulator is intended to remain open until sufficient individual batch melts have passed through to fill the accumulator to the extent required for the casting of a single large plate, lens or other large object. The valve is then frozen for the limited time required to empty the accumulator.

During the filling of the accumulator, the "freeze" valve beyond the accumulator is closed. It is then opened and the temperature at this point raised above that of the accumulator. The temperature may be 1300° C. if the accumulative contents are 1250° C. The increased fluidity promotes free discharge from the accumulator through the final stirrer and conveyer.

By practicing the process above described, and by the use of the above-mentioned apparatus, I am able to materially increase the yield of glass that may be cast in a single operation of a high quality as regards freedom from bubbles, absence of inclusions of different refractive indices and the maintenance of homogeneity, that is uniformity of refractive index.

While I have described and exemplified the preferred mode of practicing the invention, it is to be understood that wide variation in operating conditions and apparatus is possible without departing from the scope of the invention as defined in the following claims.

What I claim is:

1. The process of preparing a homogeneous plate or lens of glass for optical purposes which consists in leading successive glass melts from a melting furnace through an extended refining passageway with attenuated superficial area at approximately furnace temperature for degasification, continuously drawing off the melts from the passageway, stirring each melt and conveying it into an accumulating reservoir having a temperature lower than the melting furnace, collecting the successive melts in the reservoir, stirring the melts so collected until the mass is homogeneous and draining the entire mass into a mold as a unitary batch.

2. The process of preparing a homogeneous plate or lens of glass for optical purposes which consists in leading successive glass melts from a melting furnace through an extended refining passageway with attenuated superficial area at approximately furnace temperature for degasification, continuously drawing off the melts from the passageway, stirring each melt and conveying it into an accumulating reservoir having a temperature lower than the melting furnace, collecting the successive melts in the reservoir, stirring the melts so collected until the mass is homogeneous and draining the combined melts from the reservoir as a single mass, stirring and conveying the mass to a mold.

3. The process of preparing a homogeneous plate or lens of glass for optical purposes which consists in leading successive glass melts from a melting furnace continuously through an extended refining passageway with attenuated superficial area at approximately furnace temperature for degasification, continuously drawing off the melts from the passageway, stirring each melt and conveying it into an accumulating reservoir having a temperature lower than the melting furnace, collecting the successive melts in the reservoir by interrupting its discharge therefrom, stirring the melts so collected until the mass is homogeneous, interrupting the delivery of further melts to the reservoir and simultaneously draining the combined melts from the reservoir into a mold as a single mass.

4. The process of preparing a homogeneous plate or lens of glass for optical purposes which consists in leading successive glass melts from a melting furnace continuously through an extended refining passageway with attenuated superficial area at approximately furnace temperature for degasification, continuously drawing off the melts from the pasageway, stirring each melt and conveying it into an accumulating reservoir having a temperature lower than the melting furnace, collecting the successive melts in the reservoir by interrupting its discharge therefrom, stirring the melts so collected until the mass is homogeneous, interrupting the delivery of further melts to the reservoir and simultaneously draining the combined melts from the reservoir, and stirring and conveying the unitary mass to a mold.

5. The process of preparing a homogeneous plate or lens of glass for optical purposes which consists in leading successive glass melts from a melting furnace continuously through a refining passageway with attenuated superficial area at approximately furnace temperature for degasification, continuously drawing off the melts from the end of the passageway, conveying it into an accumulating reservoir having a temperature lower than the melting furnace, collecting the successive melts in the reservoir, stirring the melts so collected until the mass is homogeneous and draining the combined melts from the reservoir into a mold as a single mass.

6. The process of preparing a homogeneous plate or lens of glass for optical purposes which consists in leading successive glass melts from a melting furnace continuously through a refining passageway with attenuated superficial area at approximately furnace temperature for degasification, continuously drawing off the melts from the end of the passageway, conveying it into an accumulating reservoir having a temperature lower than the melting furnace, collecting the successive melts in the reservoir, stirring the melts so collected until the mass is homogeneous, and draining the combined melts from the reservoir into a mold as a single mass.

7. The process of preparing a homogeneous plate or lens of glass for optical purposes which consists in melting a glass batch in a furnace at from 1400 to 1450° C., leading said molten glass continuously through an extended narrow passageway having an attenuated superficial area while maintaining approximately the furnace temperature, continuously conveying the degasified molten glass to a reservoir where it is maintained at approximately 1250° C. until substantially free from cords, striae and stones, stirring the glass until substantially homogeneous, interrupting the delivery of fresh molten glass and draining the entire glass at a higher temperature from the reservoir to a mold as a unitary mass.

8. Apparatus for preparing glass for optical purposes which comprises a melting furnace, a refining furnace having an extended passageway with attenuated superficial area, a discharge duct from the melting furnace to the refining furnace, a reservoir, a duct from the refining furnace to the reservoir, a stirrer in said last mentioned duct, a stirrer in the reservoir, a casting discharge duct from the reservoir and a stirrer in said last mentioned discharge duct.

9. Apparatus for preparing glass for optical purposes, which comprises a melting furnace, a refining furnace having an extended passageway with attenuated superficial area, a discharge duct from the melting furnace to the refining furnace, a reservoir, a duct from the refining furnace to the reservoir, a rotary spiral stirrer in said last mentioned duct, a casting discharge duct from the reservoir and a rotary spiral stirrer in said last mentioned duct.

References Cited by the Examiner

UNITED STATES PATENTS

| | | | |
|---|---|---|---|
| 698,766 | 4/1902 | Voelker | 65—136 X |
| 1,872,664 | 8/1932 | Brown | 65—178 |
| 1,963,763 | 6/1934 | Smith | 65—135 |
| 2,115,408 | 4/1938 | Brosse | 65—146 |
| 2,569,459 | 10/1951 | De Voe | 65—134 |

DONALL H. SYLVESTER, *Primary Examiner.*

WILLIAM J. STEPHENSON, BENJAMIN HENKIN,
*Examiners.*

F. W. MIGA, *Assistant Examiner.*